Jan. 15, 1929.

A. M. SEVAULT ET AL 1,699,031

VEHICLE

Filed Aug. 13, 1926

INVENTORS:
Alfred Marie Sevault
and
Auguste Leon Jean Gérard

ATTORNEY

A. M. SEVAULT ET AL 1,699,031

VEHICLE

Filed Aug. 13, 1926  6 Sheets-Sheet 6

Inventors:
Alfred Marie Sevault
and
Auguste Leon Jean Gérard
By 
Attorney.

Patented Jan. 15, 1929.

1,699,031

UNITED STATES PATENT OFFICE.

ALFRED MARIE SEVAULT, OF PARIS, AND AUGUSTE LÉON JEAN GÉRARD, OF SERVES, FRANCE.

VEHICLE.

Application filed August 13, 1926, Serial No. 129,021, and in France August 18, 1925.

The object of our invention is to provide a device adapted to be secured on a vehicle or machine for the purpose of jacking it up to a certain height from the ground, and, once so jacked, either to keep it in such position or to swing or turn it through any desired angular distance, thereby modifying its directional setting as desired and, lastly, when so jacked and whether veered or not, to lower it to normal position, the said device then folding up and being stowed away under the vehicle or other machine that carries it.

Broadly, our device consists of two lateral supporting members the bottoms of which are curvilinear in form, such members being connected with the chassis or other part of the vehicle by means of articulated levers controlled by screws and traveling nuts, said screws being adapted to be rotated at a predetermined time in order to cause the articulated levers to be unfolded and the vehicle or other machine to be jacked up as soon as the supporting members come to bear on the ground. The desired turning or swinging movement is obtained, once the jacking has been completed, by means of, for instance, two suitable endless belts mounted on the said supporting members and adapted to be driven in directions opposite to one another. Any suitable power can be used for producing those various motions but is preferably provided, in the case of a motor vehicle, by the latter's own engine. The said jacking and turning may, if there is occasion, be effected separately or simultaneously.

The accompanying drawing represents, as an example, an embodiment of the device the general characteristics of which we have just disclosed, as applied to a motor-car.

In said drawing:

In Figure 6 the device is shown folded underneath the car the wheels of which rest on the ground.

In Figure 7 the car is in raised or jacked position.

In Figure 8 the car is jacked up empty and tilted forward, towards the motor, the weight of which causes such tilting.

In Figure 9 the rear part of the jacked up car is supposed to be heavily laden on rear.

Figure 10 is a diagrammatic bottom plan view to indicate the manner in which the car may be turned.

Figure 15:
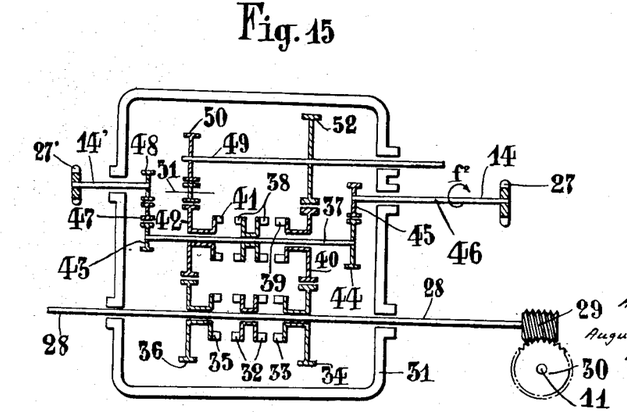
Figure 15 is a diagram of the clutch mechanism which is controlled by such lever.

The side rails of the chassis of the vehicle are indicated at 1 and 2. On said rails are secured two slides 1' and 2', with which are connected the two aforementioned supporting or jacking devices. Each of these devices consists of a beam 3 (Figure 3) made of one or several parts, the bottom surface of which is curvilinear; and such beam has pivoted to its opposite ends at 6 and 7 the lower ends of two levers 4 and 5 whose upper ends are pivoted at 10 to two nuts 8 and 9 adapted to travel within the slides 1' and 2' on the oppositely-threaded portions of a screw-rod or shaft 11, the ends of which can freely rotate within two bearings 12 and 13 fixed on the chassis. On said bearings are pivotally mounted at 14 and 14', 14" and 14''' (Figures 2, 3 and 15), four connecting rods 15 (only two of which are visible on the drawing). Said connecting rods are pivotally secured at the other end, to pins 16 on the middle portions of the arms or levers 4 and 5, the axis-to-axis distance between said arms being twice the length of the said connecting rods 15.

Figure 1:
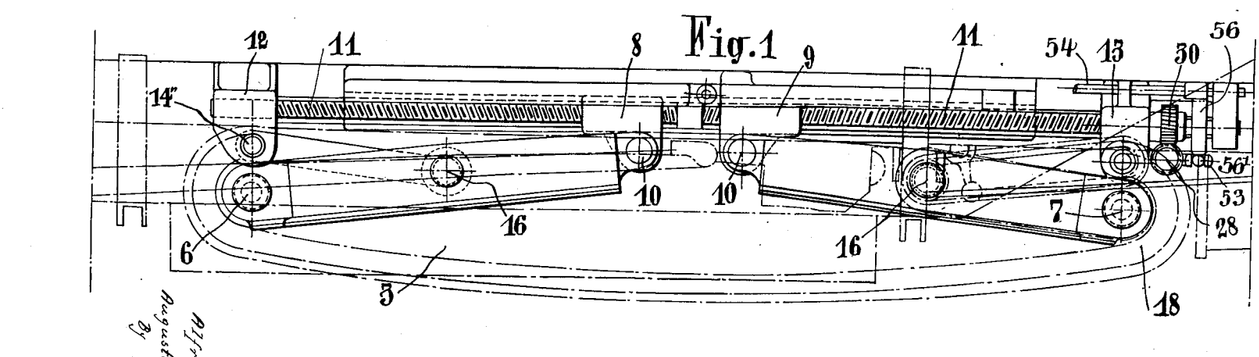
Figure 1 is a fragmental side elevation showing our device in its folded position under the chassis of the car.
Figure 2:
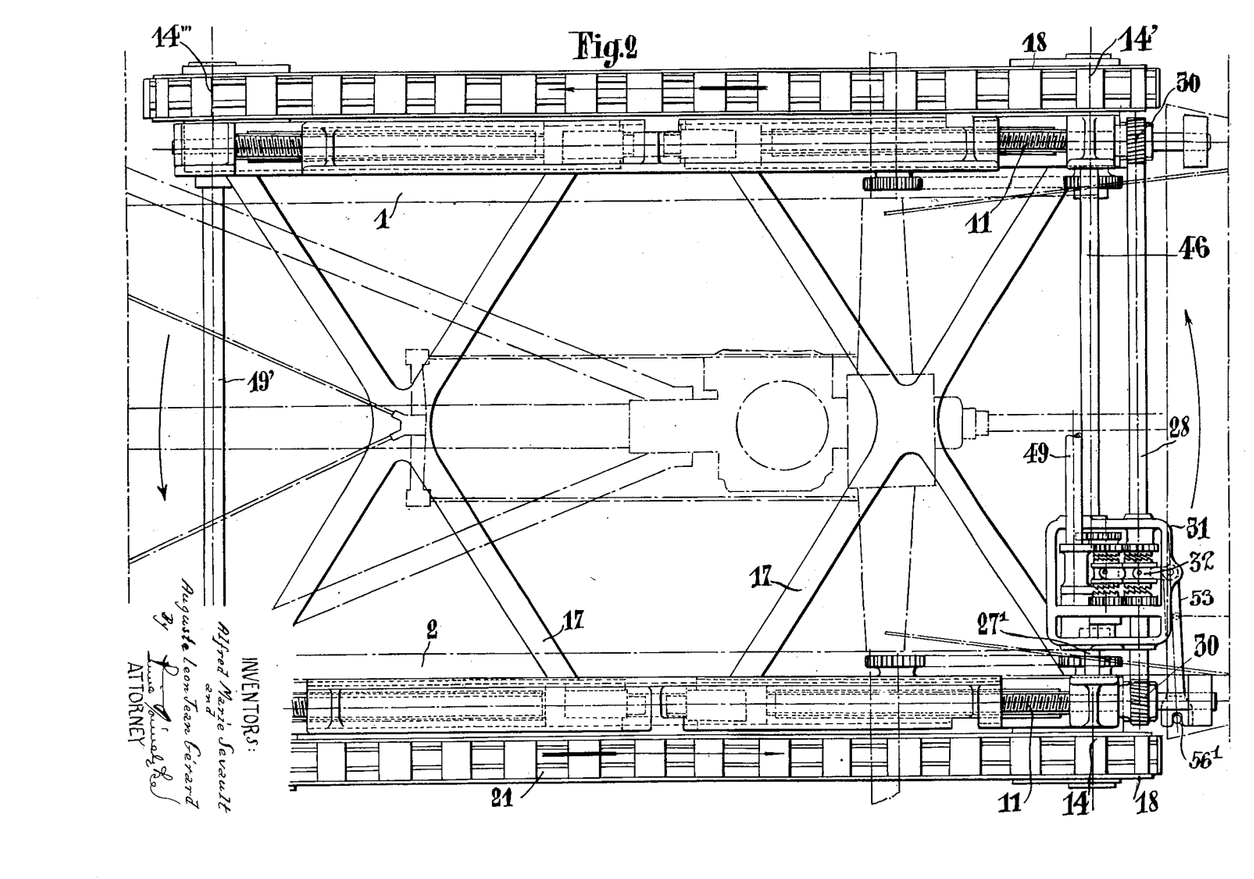
Figure 2 is a top plan view of Figure 1.
Figure 4:
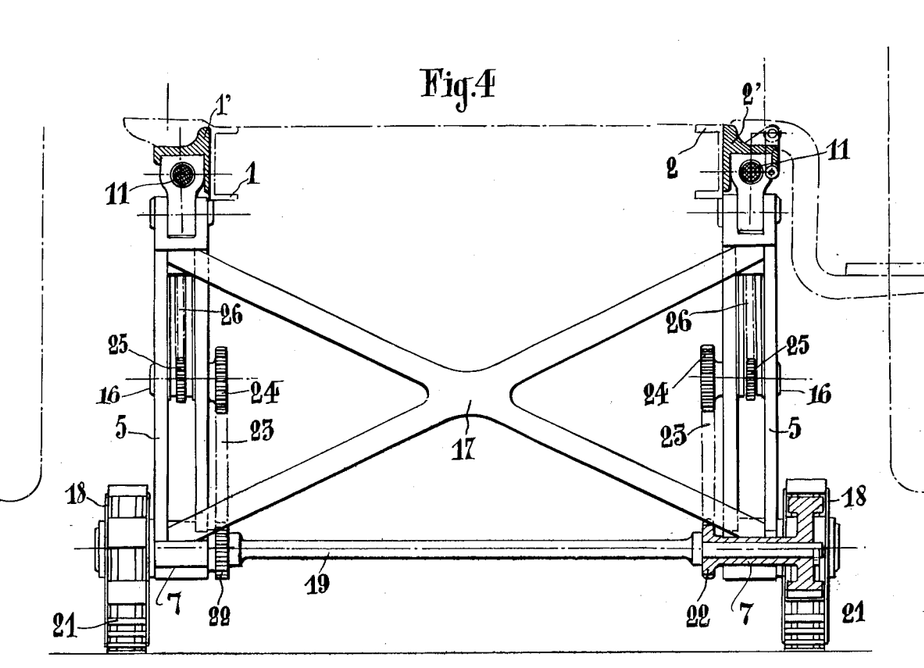
Figure 4 is a vertical cross section on line A—B of Figure 3.
Figure 5:
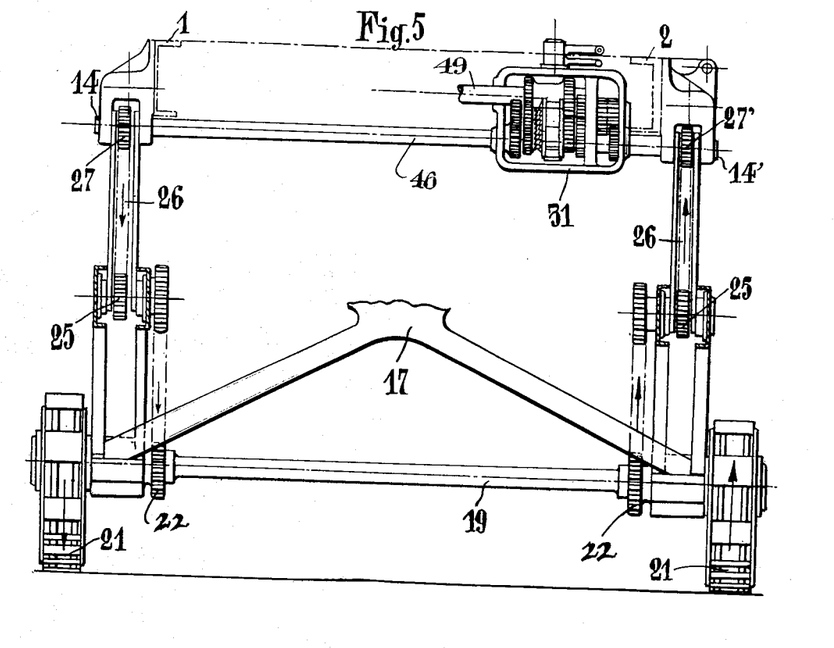
Figure 5 is a similar view on line C—D—E of Figure 3.
Figure 6:
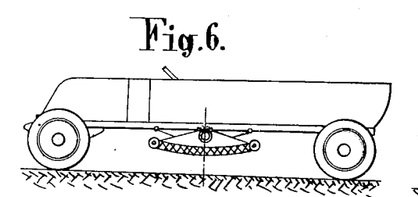
Figures 6, 7, 8, 9, 10 diagrammatically show the utilization or operation of the device.
Figure 7:
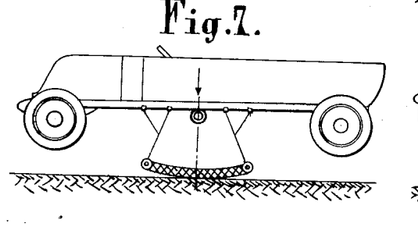
Figure 8:
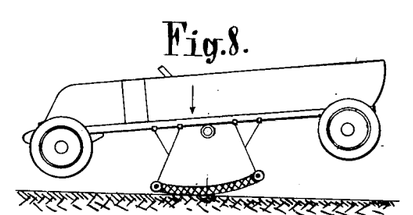
Figure 9:
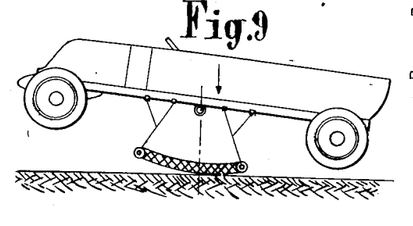

As will be apparent from Figures 2, 4 and 5, the arms 4 and 5 are reinforced by crosspieces or stays 17, the number and arrangement of which may be any desired; indeed, in some cases, these reinforcing contrivances can be done away with altogether.

Figure 3:
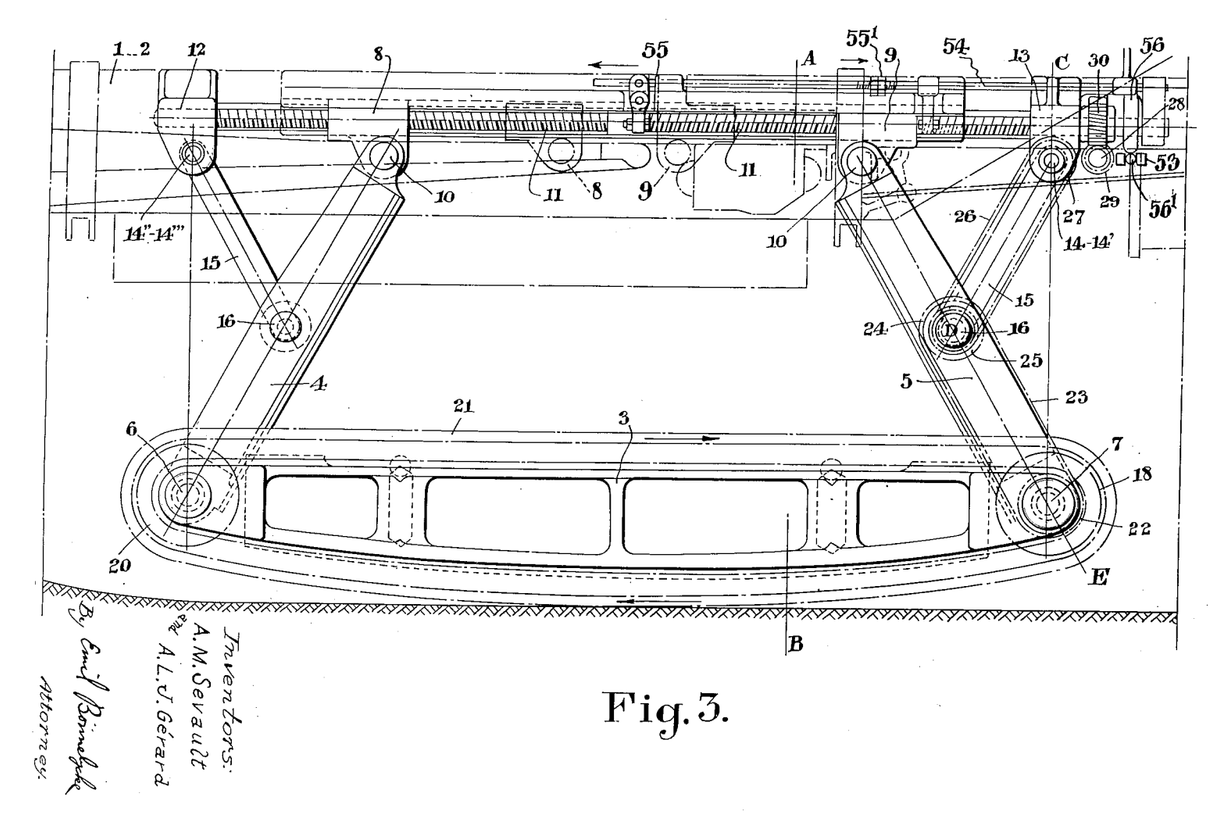
Figure 3 is a side elevation showing our device in unfolded or jacking position.

It will now be readily realized that if, by any convenient means the two threaded rods 11 are made to rotate in either direction, the nuts 8 and 9 will be moved closer to or farther from one another according to the direction in which the rods are rotated. Arms 4 and 5 being, for instance, in the folded position shown by Figure 1, then, on rods 11 being rotated in the direction suitable for moving nuts 8 and 9 apart, the movement of the nuts will serve to bring said arms into a more nearly vertical position, as shown by Figure 3. This movement will cause the supporting beams 3 to be lowered until they contact with the ground, when, through reaction, said beams bearing on the ground and rods 11 continuing to be rotated, the vehicle will be jacked up.

If we reverse the rotary motion, levers 4 and 5 will be shifted in the reverse direction. As these are being shifted, the wheels of the vehicle will be let down until they contact with the ground, and the threaded rods 11, continuing always to be rotated in the same direction, will lift the supporting beams from contact with the ground. The vehicle will then rest on its wheels, and levers 4 and 5, together with the supporting beams, will be returned to their initial position, which is the one shown by Figure 1.

Figure 10:
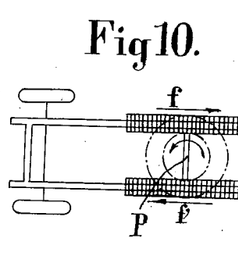
Figure 11:
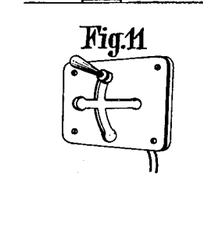
Figures 11, 12, 13 and 14 show, in various positions, the lever for controlling the several movements.
Figure 12:
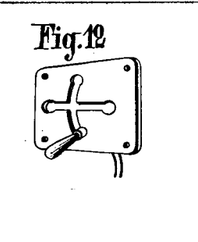
Figure 13:
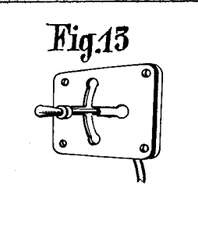
Figure 14:
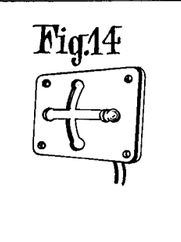

In order to obtain the sluing or turning movement of the jacked up vehicle we utilize the following mechanism:

The pivots 6 and 7 at the opposite ends of the beams 3 and to which the lower ends of the arms or levers 4 and 5 are articulated are in the form of sleeve spindles; and the two front sleeves 6 fit loosely on the ends of a cross-shaft 19', while the two rear sleeves 7 fit similarly on the ends of a cross-shaft 19. The latter sleeves have fixed to them a pair of sprocket pinions 18 and, in addition, a second pair of pinions 22, and the front sleeves are similarly provided with fixed pinions 20 connected by chains 21 with the corresponding pinions 18. The said pinions 18 are utilized to drive the chains 21, and they must be rotated inversely to each other; and to effect that, each pinion 22 is connected by a chain 23 (Figure 4) with a pinion 24 secured to the pivot sleeve or spindle 16 rotatably mounted in the corresponding arm 5, these spindles 16 each carrying a second fixed pinion 25. The pinions 25 are connected by chains 26 to pinions 27, 27' secured to the pivots or spindles 14 and 14' whereon the connecting rods 15 are loosely mounted. Consequently, if the two sets of gearing just described are rotated inversely, the two pinions 18 will also be inversely rotated, and the chains 21 driven by said pinions will be caused to travel in opposite directions with relation to each other, as will be apparent from the arrows $f$ and $f'$ in Figure 10; such opposite travel of the chains, through reaction on the ground, causing the vehicle to be turned or slued around point P.

It should be noticed, by referring to Figures from 6 to 9, that whatever the loading of the car and whatever the point of application of the load thereon, the projection of its center of gravity will always pass through the polygon formed by the curvilinear bearing surface 3 and the arms or levers 4, 5 connected thereto; consequently, the car will always be in stable equilibrium and, therefore, its pivoting movements can be effected in all cases.

We will now describe in detail the means for effecting the jacking up and the letting down of the vehicle and, on the other hand, the means whereby the vehicle is slued or turned while jacked up.

At the ends or at any other suitable point of the side walls 1 and 2 are provided bearings to receive the ends of a shaft 28 having two worms 29 adapted to mesh with worm wheels 30 secured on screws 11. Said shaft 28 runs through a casing 31 containing the driving or reversing gear said device comprises a double claw coupling 32 keyed (see Figure 15) to slide on the said shaft to be brought into engagement either with a corresponding clutch wheel 33, integral with a pinion 34 mounted idle on said shaft 28, or with a second clutch wheel 35 integral with a pinion 36 idly rotating in the opposite direction to pinion 34.

The means designed to control the sluing or turning of the vehicle is comprised as follows:

Parallelly to shaft 28 is housed in the casing 31 a stub shaft 37, which carries a double clutch sleeve 38 similar to the above mentioned sleeve or coupling 32, and combined, on the one hand, with a clutch wheel 39, integral with a pinion 40, mounted idle on the said shaft 37, and, on the other hand, with a second clutch wheel 41, integral with a pinion 42, also mounted idle on the end of that shaft 37.

On the ends of shaft 37 are keyed two pinions 43 and 44, the latter meshing with a pinion 45, fast on the end of a spindle 46 the other end 14 of which carries the already described pinion 27. The other pinion 43 on shaft 37 meshes with an intermediate reversing pinion 47 meshing in its turn with a pinion 48 secured on the spindle 14' that carries pinion 27'.

The whole above described gear is combined with a driving shaft 49 adapted to receive its rotary motion, at the driver's discretion, from the vehicle engine which is connected to shaft 49 by suitable auxiliary clutch mechanism (not shown) constructed and arranged to disconnect the driving wheels from the engine power when shaft 49 is connected. The driving shaft 49 carries on its free end a pinion 50 meshing with a reversing pinion 51, which meshes, on the other hand, with pinion 42, which itself meshes with the pinion 36. Opposite pinion 40 on shaft 37 and in mesh therewith, there is secured on said shaft 49 a second pinion 52.

We will now explain the general operation of the mechanism which we have just described.

Supposing the mechanism is in folded or stowed away position, (Figure 1); in order to jack up the vehicle, the driver operates the auxiliary clutch so as to cause shaft 49 to be rotated. While said shaft 49 is rotating, the driver will merely have to operate the double sleeve or coupling 32 by means of a suitable control such as, for instance, the one shown by Figures 11, 12, 13 and 14, so as to couple the said sliding sleeve with the clutch wheel 33 and, hence, with gear 34, which latter is being rotated from shaft 49 by the gears 52 and 40. Sleeve 32 being in mesh with clutch wheel 33, shaft 28 will be rotated in a predetermined direction (the direction for unfolding the levers) and will transmit its motion to the two worms 29 and, thereby, to the two worm wheels 30 carried by the screw shafts 11. Being rotated, these screws will cause the nuts 8 and 9 to be moved apart, the sustaining surfaces to be lowered and then the vehicle to be jacked up as hereinbefore explained.

In order to effect the reverse operation, the driver will merely have to release the sleeve or coupling 32 from the clutch wheel 33 and to couple it with the second clutch wheel 35. Then shaft 28 will be rotated in the reverse direction, causing the reverse motion sought for (letting down of the vehicle).

When the maximum or minimum separation of nuts 8 and 9 is obtained, a releasing device acting on the controlling lever 53 of the double coupling 32 will automatically return the latter to an intermediate position in which it is out of mesh with both clutch members 33 and 35. This releasing device is illustrated more or less diagrammatically in Figures 2 and 3 and comprises an endwise-movable rod 54 carrying a pair of spaced stop collars 55 and 55' on its inner portion and having fixed on its outer end a depending arm 56 provided with a terminal finger 56'. The latter fits in the forked outer end of the above-mentioned controlling lever 53 which, as shown, is pivoted intermediate its ends and is engaged at its inner end with coupling 32, so that a rocking movement of said lever in one direction or the other will shift coupling 32 into engagement with either clutch member 33 or 35, according to the direction of movement. The endwise movement of rod 54 is effected by means of the nut 9 which, at the end of its travel toward nut 8, will strike against collar 55 and thus shift said rod inward or toward the left (Figure 3) and on reaching the end of its travel away from nut 8, will strike against collar 55' and move the rod outward or toward the right. Both movements of said rod will produce the movement of the double coupling into neutral position and, hence, the interruption of the drive.

We would point out here that, due to the irreversibility of the threads of the screw shafts 11, when the vehicle is jacked up, its weight cannot cause any collapsing of the mechanism when the double sleeve 32 is released.

The car being in jacked up position, in order to cause sluing or turning, the driver will merely have, as already stated, to cause the endless belts 21 to be driven in opposite directions to one another. For this purpose, the driver will operate the controlling lever previously described to bring the double sleeve 38 either into mesh with clutch wheel 39 or with clutch wheel 41, according as he wants the pivoting to take place rightwards or leftwards. In the case, for instance where the double sleeve 38 is made to mesh with wheel 39, shaft 46 will be rotated in the direction indicated by the arrow $f^2$ in Figure 15, and spindle 14' will be rotated in the direction inverse to the one of shaft 46, movement in opposite directions of the endless belts being thereby effected.

In order to cause pivoting in the reverse direction, the driver only has to uncouple sleeve 38 from member 39 and couple it to member 41; shaft 46 will then be rotated in the direction inverse to the one indicated by arrow $f^2$ and spindle 14' will be rotated in the direction opposite to the previous one.

We wish it to be clearly understood that the embodiment herein described is in no way intended as limitative and that we reserve the right to introduce any modifications and changes within the scope of our invention as claimed.

Furthermore, we may mount on the motor vehicle or on the machine concerned the whole or any part of the above described mechanism.

We wish it to be clearly understood also that the control of the various gears in the transmission box 31 may be achieved by means of a single or of a multiple device located at any suitable point on the vehicle or other machine, while, in certain cases said control may be a distant one.

The box 31 may, in like manner, be replaced by suitably combined differential gears.

Any other similar modifications of details should equally be held to be covered by our invention.

We claim as our invention:

1. Mechanism for jacking-up, turning and lowering a motor vehicle or the like, comprising ground-engaging supporting means for the vehicle, lever connections between said supporting means and the vehicle foldable toward and unfoldable away from said vehicle, means for alternatively unfolding said levers to jack-up the vehicle and folding them to return the vehicle to its normal lowered position, and means operative upon said supporting means to turn the vehicle about a point located approximately centrally of the vehicle.

2. Mechanism for jacking-up, turning and lowering a motor vehicle or the like, comprising two lateral supporting members connected with the vehicle by articulated levers, and oppositely threaded screws and nuts for unfolding said levers so as to jack up the vehicle, or for folding the levers so as to permit them to be returned to lowered position; in combination with endless belts mounted on the above mentioned supporting members, and means for driving said belts in directions opposite to one another.

3. Mechanism for jacking-up, turning and lowering a motor vehicle or the like, comprising, located one on each side of the vehicle, two supporting members having curvilinear bottom parts, each member carrying an endless belt having driving pinons and guiding means associated with it; articulated levers connecting said supporting members with threaded nuts adapted to travel on screw shafts the ends of whch are adapted to rotate in bearings secured on the vehicle; means for connecting the two screw shafts with each other and with a shaft rotated from the motor of the vehicle so as to cause said screw shafts to be rotated in one or in the other direction, and thereby unfold or fold the articulated levers so as to jack up or to let down the vehicle; a connection for transmitting a driving movement from the motor to the said endless belts to cause them to move in directions opposite to one another when the vehicle has been jacked up and consequently to effect the sluing of the vehicle to any desired position; and a device for throwing the various controls into or out of gear as desired according to the various operations to be effected.

4. Mechanism for jacking-up, turning and lowering a motor vehicle or the like, comprising ground-engaging supporting means for the vehicle, lever connections between said supporting means and the vehicle foldable toward and unfoldable away from said vehicle, screw-and-nut mechanism operatively related to said connections to unfold or fold the same alternatively and thereby jack-up the vehicle or return it to its normal lowered position, and means operative upon said supporting means to turn the vehicle about a point located approximately centrally of the vehicle.

5. Mechanism for jacking-up, turning and lowering a motor vehicle or the like, comprising a pair of companion ground-engaging supporting devices for the vehicle, foldable connections between said supporting means and the vehicle, means for alternatively unfolding said connections to jack-up the vehicle and folding them to return the vehicle to its normal position, and means acting in one direction upon one supporting device and in the opposite direction upon the other device to turn the vehicle in either direction about a point located approximately centrally of the vehicle.

6. Mechanism of the character described comprising a pair of lateral supporting members, connections between said members and the frame of a vehicle, means operatively related to said connections for alternatively jacking-up the vehicle and lowering it to normal position, an endless belt mounted on each supporting member, and means for driving said belts in opposite directions while the vehicle is elevated to turn it about a central point.

7. The combination, with mechanism for jacking-up a vehicle and supporting it in elevated position, said mechanism including a pair of lateral ground-engaging members; of mechanism operative simultaneously in one direction upon one of said members and in the opposite direction upon the other member while the vehicle is elevated to turn it in either direction about a central point.

8. In a motor vehicle, the combination of a pair of lateral supporting devices, a set of foldable lever connections between each supporting device and the frame of the vehicle, mechanism for alternatively unfolding both sets of connections to lower the supporting devices and thereby jack-up the vehicle and folding said sets to raise said devices and thereby return the vehicle to its normal lowered position, and means operative upon the two supporting devices to turn the vehicle about a point located approximately centrally of the vehicle.

9. In a motor vehicle, the combination of a pair of companion lateral supporting devices, mechanism for alternatively lowering both devices simultaneously into engagement with the ground so as to jack-up the vehicle and raising both devices simultaneously so as to return the vehicle to its normal lowered position, and mechanism acting simultaneously in one direction upon one supporting device and in the opposite direction the other device to turn the vehicle in either direction about a point located approximately centrally of the vehicle.

10. The combination, with mechanism for jacking-up a vehicle and supporting it in elevated position, said mechanism including a pair of companion lateral supporting members each having an endless ground-engaging belt surrounding it; of mechanism for simultaneously driving one belt in one direction and the other belt in the opposite direction while the vehicle is elevated to turn it about a point centrally between the belts.

In testimony whereof we affix our signatures.

ALFRED MARIE SEVAULT.
AUGUSTE LÉON JEAN GÉRARD.